(12) United States Patent
Schwartz et al.

(10) Patent No.: US 7,818,263 B2
(45) Date of Patent: Oct. 19, 2010

(54) TECHNIQUE FOR EFFECTIVELY GENERATING MULTI-DIMENSIONAL SYMBOLS REPRESENTING POSTAL INFORMATION

(75) Inventors: Robert G. Schwartz, Branford, CT (US); George M. Brookner, Norwalk, CT (US); Edward Naclerio, Madison, CT (US); Eric Zuidema, Norwalk, CT (US)

(73) Assignee: Neopost Technologies, Bagneux (FR)

( * ) Notice: Subject to any disclaimer, the term of this patent is extended or adjusted under 35 U.S.C. 154(b) by 540 days.

(21) Appl. No.: 11/637,834

(22) Filed: Dec. 13, 2006

(65) Prior Publication Data

US 2007/0239620 A1 Oct. 11, 2007

Related U.S. Application Data

(63) Continuation of application No. 09/308,451, filed as application No. PCT/US98/19652 on Sep. 21, 1998, now abandoned.

(60) Provisional application No. 60/059,486, filed on Sep. 22, 1997.

(51) Int. Cl.
  *G06F 21/00* (2006.01)
(52) U.S. Cl. .............................. 705/60; 705/51; 705/62; 705/64; 705/79; 380/28; 380/55; 726/3
(58) Field of Classification Search .................... 705/51, 705/60–79; 380/28, 55; 726/3
  See application file for complete search history.

(56) References Cited

U.S. PATENT DOCUMENTS

| | | | |
|---|---|---|---|
| 3,877,531 A * | 4/1975 | Storace et al. | 177/1 |
| 4,580,144 A | 4/1986 | Calvi | |
| 4,835,713 A | 5/1989 | Pastor | |
| 4,858,138 A | 8/1989 | Talmadge | |
| 4,934,846 A * | 6/1990 | Gilham | 400/104 |
| 5,053,609 A * | 10/1991 | Priddy et al. | 235/436 |
| 5,200,903 A | 4/1993 | Gilham | |

(Continued)

FOREIGN PATENT DOCUMENTS

CA   2019956   8/2000

(Continued)

OTHER PUBLICATIONS

*Information Based Indicia Program (IBIP) Indicium Specification*, Jun. 13, 1996, XP002137735.

*Primary Examiner*—Pierre E Elisca
*Assistant Examiner*—Shahid Kamal
(74) *Attorney, Agent, or Firm*—Townsend and Townsend and Crew LLP

(57) ABSTRACT

In a mailing system for franking a postage indicium serving as a proof of postage, postal data including the postage needs to be communicated through such an indicium. Illustratively, the postal data is categorized into (a) invariable postal data, e.g., a device ID identifying the mailing system, which is unaffected by a franking transaction, and (b) variable postal data, e.g., the postage, which may change from one franking transaction to another. To avoid latency of the franking operation, the invariable postal data is preset for initial printing of the postage indicium, and the variable postal data is determined and set for printing in real time. In printing the postage indicium, the invariable postal data and the variable postal data are presented in that order in one or more symbols.

18 Claims, 7 Drawing Sheets

U.S. PATENT DOCUMENTS

| | | | | |
|---|---|---|---|---|
| 5,231,668 | A | * | 7/1993 | Kravitz ........................ 380/28 |
| 5,324,923 | A | | 6/1994 | Cymbalski et al. |
| 5,390,251 | A | * | 2/1995 | Pastor et al. ................... 705/62 |
| 5,408,416 | A | | 4/1995 | Gilham |
| 5,444,631 | A | * | 8/1995 | Vermesse ..................... 705/404 |
| 5,535,279 | A | * | 7/1996 | Seestrom ...................... 380/55 |
| 5,602,977 | A | | 2/1997 | Lee |
| 5,608,636 | A | * | 3/1997 | Guenther .................... 705/408 |
| 5,651,103 | A | | 7/1997 | Arsenault et al. |
| 5,699,257 | A | | 12/1997 | Emmett et al. |
| 5,701,249 | A | * | 12/1997 | Berson ....................... 705/408 |
| 5,734,723 | A | | 3/1998 | Windel et al. |
| 5,765,475 | A | | 6/1998 | Salomon |
| 5,796,834 | A | * | 8/1998 | Whitney et al. ................. 705/60 |
| 5,815,172 | A | | 9/1998 | Moh |
| 5,822,739 | A | * | 10/1998 | Kara .......................... 705/410 |
| 5,943,432 | A | | 8/1999 | Gilmore et al. |
| 5,978,781 | A | * | 11/1999 | Sansone ...................... 705/408 |
| 6,061,671 | A | * | 5/2000 | Baker et al. .................. 705/404 |
| 6,102,592 | A | | 8/2000 | Herbert |
| 6,175,827 | B1 | | 1/2001 | Cordery et al. |
| 6,671,813 | B2 | * | 12/2003 | Ananda ......................... 726/3 |
| 7,136,839 | B2 | * | 11/2006 | Lee et al. ...................... 705/60 |
| 2002/0073040 | A1 | * | 6/2002 | Schwartz et al. ............... 705/62 |

FOREIGN PATENT DOCUMENTS

| | | |
|---|---|---|
| CA | 2263434 | 10/2002 |
| DE | 37 31 509 | 3/1988 |
| EP | 0 304 519 A1 | 3/1989 |
| EP | 0 757 325 A2 | 7/1995 |
| EP | 0 686 946 | 12/1995 |
| EP | 0 741 374 | 11/1996 |
| EP | 0 757 325 | 2/1997 |
| EP | 0 780 804 | 6/1997 |

* cited by examiner

100

150

503

700

800

TECHNIQUE FOR EFFECTIVELY GENERATING MULTI-DIMENSIONAL SYMBOLS REPRESENTING POSTAL INFORMATION

This is a continuation of application Ser. No. 09/308,451 filed 19 May 1999 now abandoned, which is a 371 national phase of PCT/US98/19652 filed 21 Sep. 1998, which claims priority to Provisional Application No. 60/059,486 filed 22 Sep. 1997, the contents of which are incorporated herein by reference.

TECHNICAL FIELD

The invention relates to a technique for generating multi-dimensional symbols representative of information, and more particularly to a technique for franking postage indicia incorporating such symbols representative of postal information.

BACKGROUND OF THE INVENTION

Communications of information, e.g., via email, telephone, mail, etc., are essential in daily life. Security and accuracy of such communications invariably are the major concerns.

To prevent tampering or unauthorized use of communications containing vital information, cryptographic methodologies for maintaining secrecy of data communications have been developed. One such methodology is RSA cryptographic method, named after its developers, Rivest, Shamir and Adleman. For details on the RSA method, one may refer to: R. Rivest et al., "A Method for Obtaining Digital Signatures and Public Key Cryptosystems," *Communications of the ACM*, Vol. 21, No. 2, February 1978. The RSA method involves a public key algorithm which uses a private key for encryption of data and a public key for decryption thereof. Unlike a private key, a public key can be published and made known to the public. The keys for the RSA algorithm are generated mathematically, and are computational inverses to each other. The success of the RSA method depends on the use of very large numbers for the keys.

In addition to providing data encryption, some cryptographic methods can be used to authenticate a message. For example, public key algorithms such as the aforementioned RSA algorithm can be used to generate a "digital signature" for verifying the origin of the message and the identity of the sender. Another algorithm known as the "Digital Signature Algorithm (DSA)" can be used for that purpose as well. For details on the DSA, one may refer to: "Digital Signature Standard (DSS)," *FIPS PUB* 186, May 19, 1994. A digital signature is distinct for each message. The sender of the message uses his/her private key to digitally sign the message, and the resulting digital signature accompanies the message. The recipient of the message uses the sender's public key to verify the digital signature. If any alteration in either the signature or message occurs, the signature does not verify.

Information may be represented using a symbology. One such symbology comprises barcodes which may be one-dimensional or two-dimensional (2-D), and may be optically scanned to recover the information represented thereby. A 2-D barcode may be formatted in accordance with the well-known Uniform Symbology Specification PDF 417. Another symbology comprises data matrix symbols, which are formatted in accordance with the "International Symbology Specification—Data Matrix," *AIM International Technical Specification*, AIM International, Inc., 1996 (hereinafter the "Data Matrix specification"), and may also be optically scanned to recover the information represented thereby.

As is well known, a data matrix symbol is made up of square modules or cells representing information. FIGS. 1A and 1B illustrate one such data matrix symbol (denoted 100), and its finder patterns (collectively denoted 150) defining data regions in symbol 100, respectively. As jointly shown in FIGS. 1A and 1B, data matrix symbol 100 includes data regions I, II, III and IV containing square modules which are disposed in arrays. A dark module represents a first-data value (e.g., binary bit "1"), and a light module represents a second data value (e.g., binary bit "0"). Symbol 100 is typically square in shape, and the number of rows (or number of columns) of the modules, and thus its size, increases with the amount of data represented thereby. Symbol 100 also includes codewords for checking and correcting errors in the data after its communication, thereby affording accuracy of the communicated data. For example, symbol 100 is of the type of the so-called "error checking and correcting (ECC) 200" data matrix symbol, and the codewords therein are generated in accordance with the well-known Reed-Solomon error correction technique.

Each data region in symbol 100 is surrounded by a finder pattern which is one module wide. For example, the finder pattern for data region I consists of solid arrays 153 and 155 made up of dark modules only, and broken arrays 157 and 159 made up of alternating dark and light modules; the finder pattern for data region II consists of solid arrays 163 and 165, and broken arrays 167 and 169; and so on and so forth. In a well known manner, the finder patterns of a data matrix symbol determine, among other things, physical size and distortion of the symbol.

Because of the ubiquitous presence of computers, in particular, personal computers (PCs), it is anticipated that use of a general purpose computer, in lieu of a specialized postage meter, to frank or print postage indicia serving as a proof of postage on mailpieces is imminent. To deter printing of unauthorized postage, the postage indicium applied on a mailpiece includes postal information which is digitally signed, and thereby can be authenticated by a postal authority when the mailpiece is processed. To facilitate the mail processing, the indicium includes a machine readable portion including a 2-D symbol, e.g., a 2-D barcode, readable by an optical scanner.

SUMMARY OF THE INVENTION

In accordance with the invention, the postage indicium is generated in a pipeline fashion to expedite a postage franking transaction. For example, in generating the postage indicium which includes at least one symbol, e.g., a data matrix symbol, representing postal data elements, as soon as new information concerning a bit map for the print image of the symbol is made available, such information is utilized to print the symbol as much as possible. To facilitate the pipeline operation, the layout of the bit map is designed in such a way that the leading portion of the bit map corresponds to those postal data elements which can be determined without regard to any subsequent postal data elements, which correspond to the remaining part of the bit map. To that end, the postal data elements to be represented are arranged in such an order that those postal data elements (e.g., postal data elements concerning accounting of dispensed postage) which need to be determined based on other postal data elements (e.g., current dispensed postage) are disposed after such other postal data elements in the bit map representation, thereby obviating the need to modify the bit map as it is being laid out and made available for printing.

In accordance with an aspect of the invention, the postal data elements are categorized into invariable and variable postal data elements. The invariable postal data elements are those data elements which are unaffected by the postage franking transaction while the remaining variable postal data elements are subject to change during the transaction. In particular, the invention embraces the approach where a single symbol is used in the machine readable portion to represent a combination of the invariable and variable postal data elements, with the invariable postal data elements processed first and represented by the leading portion of the symbol, followed by the variable postal data elements represented by the remaining portion of the same symbol, as the invariable postal data elements are independent of the subsequent, variable postal data elements.

The invention also embraces a multi-symbol approach where the machine readable portion includes at least a first symbol and a second symbol. The first symbol is used to represent those invariable postal data elements and preset for printing. The second symbol is used to represent the variable postal data elements and created in real time of the franking transaction. During the franking transaction, to avoid latency, the first symbol is printed before the second symbol.

To further expedite the postage franking transaction, prior to the transaction, selected data (e.g., the postage to be dispensed) having an unknown value is assumed using a predicted value to generate one or more candidates for at least one postal data element dependent upon the selected data. The predicted value may be statistically determined. The actual value of the selected data is subsequently compared with the predicted value. If the actual value matches the predicted value, the candidate corresponding to the predicted value is adopted during the transaction.

Other ways to expedite the franking transaction include computing at least part of a digital signature for authenticating the postal data elements represented by the postage indicium prior to the franking transaction. Where the size of a symbol in the machine readable portion of the postage indicium exceeds the print coverage of a single printhead in a printer, a print assembly in accordance with the invention which includes multiple printheads is used to print the symbol or its equivalent, thereby effectively communicating the data represented by the symbol in a single pass of the print assembly, as opposed to multiple passes required of the single printhead.

BRIEF DESCRIPTION OF THE DRAWING

Further objects, features and advantages of the invention will become apparent from the following detailed description taken in conjunction with the accompanying drawing, in which.

Throughout the figures of the drawing, the same reference numerals and characters are used to denote like features, elements, components or portions of the illustrated system.

DETAILED DESCRIPTION

Figure 2:
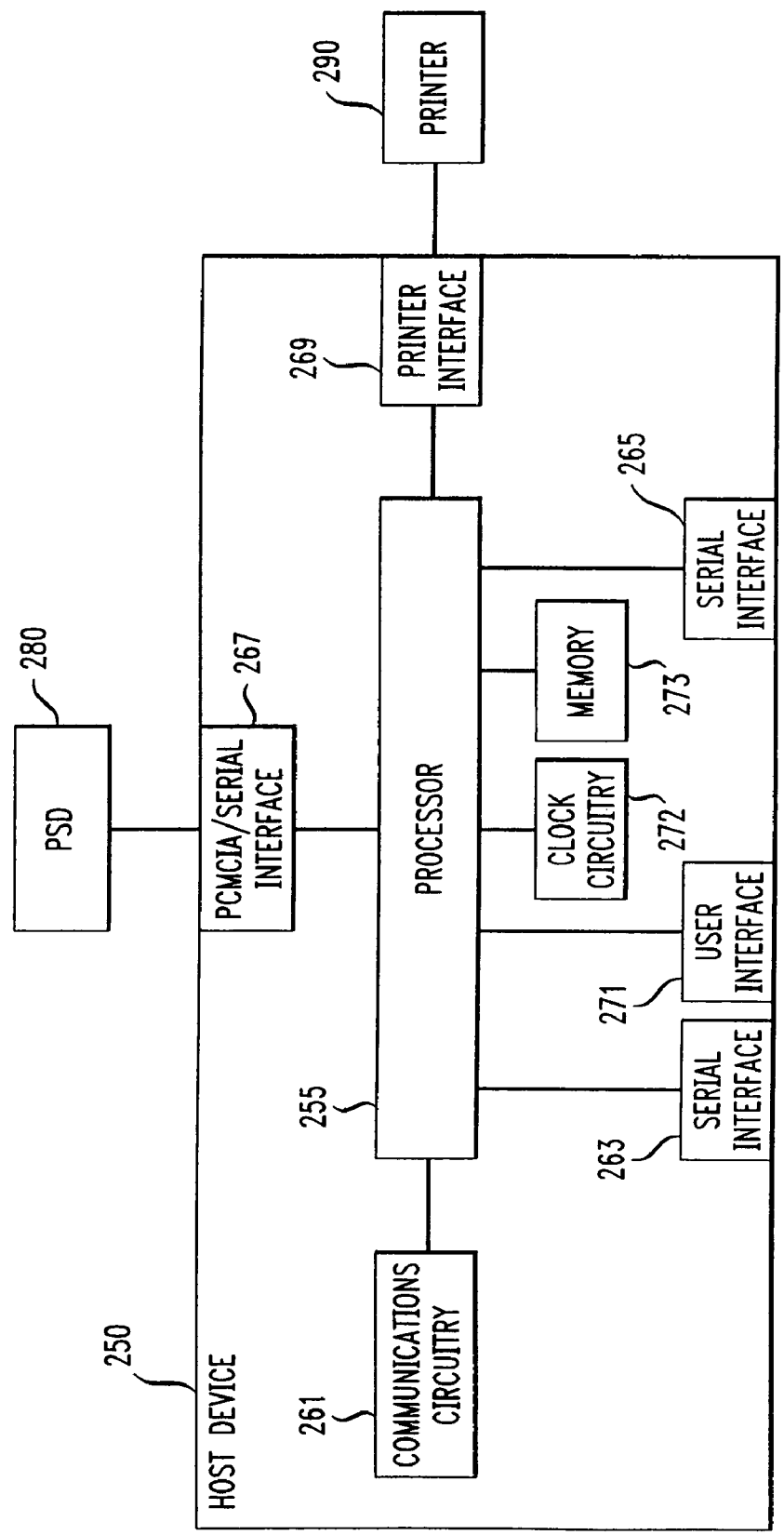
FIG. 2 is a block diagram of a mailing system in accordance with the invention.

FIG. 2 illustrates mailing system 201 embodying the principles of the invention for franking postage onto a given medium, e.g., a mailpiece, tape, etc. As shown in FIG. 2, system 201 includes host device 250, postal security device (PSD) 280 and printer 290. System 201 may be configured as an "open system," where host device 250 comprises a personal computer (PC), workstation or general purpose computing machine, and PSD 280 and printer 290 serve as peripherals to host device 250. System 201 may alternatively be configured as a "closed system," where host device 250 and printer 290 are dedicated to the postage franking operation and typically enclosed in the same casing, and where PSD 280 may or may not be enclosed therein.

Without loss of generality, in this illustrative embodiment, system 201 is configured as a closed system. Central to host device 250 is processor 255 which is programmed to, among other things, communicate and process data to effect postage franking in accordance with the invention. Device 250 is connected through printer interface 269 to printer 290 for controllably printing postage indicia onto a given medium, which serve as a proof of postage. Printer 290 may incorporate well known laser, thermo transfer or inkjet technology. Device 250 also includes communications circuitry 261, serial interfaces 263 and 265, PCMCIA or serial (PCMCIA/serial) interface 267, user interface 271, clock circuitry 272 and memory 273. Communications circuitry 261 includes conventional modem circuitry for establishing connections to communication networks, e.g., the Internet. Serial interfaces 263 and 265 may be used for connection with devices such as a conventional optical scanner and postage scale. Interface 267 in this instance is used for connection with PSD 280 which is realized as an integrated circuit (IC) card or a "smart" module peripheral to device 250, and user interface 271 for connection with a keypad (not shown), a display (not shown) and/or an indicator device such as a mouse (not shown) for user inputs. Clock circuitry 272 keeps track of the current date and time for system 201. Memory 273 is used to store data and program routines for instructing processor 255 to perform various functions. One such program routine may be a postage franking routine described below for instructing processor 255 to carry out the postage franking operation in accordance with the invention.

Figure 3:
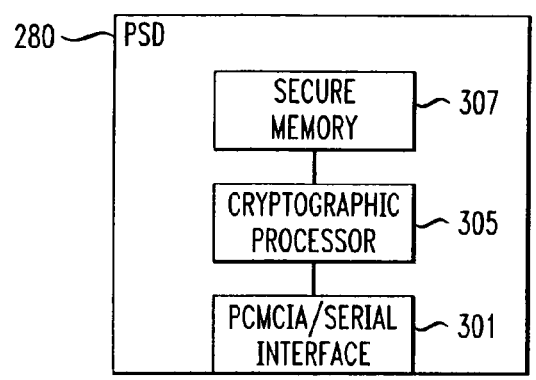
FIG. 3 is a block diagram of a postal security device used in the mailing system of FIG. 1.

Referring to FIG. 3, PSD 280 includes PCMCIA and/or serial (PCMCIA/serial) interface 301 for interfacing with and insertion into host device 250, cryptographic processor 305, and secure memory 307. The components in PSD 280 may be realized using a chip set of the type of the NETARMOR VMS310 chip set manufactured by VLSI Technology, Inc, or alternatively the chip set typified by smart card technology.

Secure memory 307 which is a nonvolatile memory includes a descending register and an ascending register. In a conventional manner, the descending register is used to keep track of an amount of postage available for dispensation. On the other hand, the ascending register is used to keep track of an amount of postage dispensed. When the value of the descending register decreases over time below a predetermined limit, system 201 can no longer dispense postage until the descending register is reset. Such a reset may be achieved by way of electronic funds transfer via a dial-up connection with a computerized central facility using communications circuitry 261, in accordance with a well-known telemeter setting (TMS) technique.

In this particular illustrative embodiment, secure memory 307 also includes a well known digital signature algorithm (DSA), a private key and the corresponding public key in accordance with the DSA. The public key may be made available to the public in a PSD certificate. For instance, using the DSA, cryptographic processor 305 may sign specified postal data with the private key to generate a digital signature to be included in a postage indicium. The PSD certificate containing the public key may also be provided in the indicium for the postal authority to verify the digital signature to authenticate the postage indicium.

Figure 4:
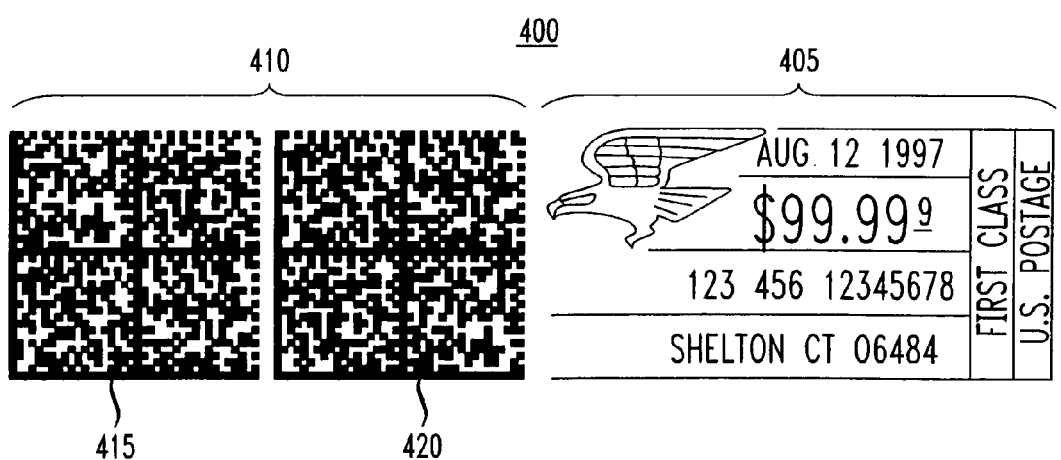
FIG. 4 illustrates a postage indicium generated by the mailing system of FIG. 1.

FIG. 4 illustrates postage indicium 400 which serves as a proof of postage and is generated by system 201 in accordance with the invention. Indicium 400 includes human readable portion 405 and machine readable portion 410. Portion 405 may include information concerning the date of mailing, postage, device ID, origination town and zip code, mail class, etc. Machine readable portion 410 may include one or more symbols representing the postal data required by the postal authority, and the digital signature for authenticating the indicium as mentioned before. In this particular illustrative embodiment, portion 410 includes multiple symbols, e.g., data matrix symbols 415 and 420 in accordance with the well known Data Matrix specification, which jointly represent the required postal data. Such postal data, for example, includes the device ID which identifies system 201, ascending register value, postage, digital signature, date of mailing, originating address licensing zip code, software ID which identifies application software including the aforementioned postage franking routine in system 201, descending register value, PSD certificate, mail class (or rate category), etc.

To expedite each postage franking transaction especially where system 201 needs to handle a high volume of mailpieces, the machine readable portion of a postage indicium which includes at least one symbol is printed in a pipeline fashion in accordance with the invention. That is, in printing the symbol, as soon as new information concerning a bit map for the print image of the symbol is made available, printer 290 utilizes such information to realize the symbol as much as possible. To facilitate the pipeline operation, the layout of the bit map is designed in such a way that the leading portion of the bit map corresponds to those postal data which can be determined without regard to any subsequent postal data, which correspond to the remaining part of the bit map. To that end, processor 255 arranges the postal data to be represented in such an order that those postal data (e.g., the ascending and descending register values) which need to be determined based on other postal data (e.g., the postage) are disposed after such other postal data in the bit map representation, thereby obviating the need to modify the bit map as it is being laid out and made available to printer 290 for printing.

We have recognized that of the required postal data, some data elements such as the device ID, originating address licensing zip code, software ID and PSD certificate are invariable with respect to system 201, and some other data elements such as the date of mailing are invariable over a period of time, e.g., 24 hours, and the remaining data elements such as the ascending register value, postage, descending register value and mail class may vary from one franking transaction to another.

Thus, in particular, the invention embraces the approach where a single symbol may be used in the machine readable portion to represent a combination of invariable and variable postal data elements, with the invariable postal data elements processed first and represented by the leading portion of the symbol, followed by the variable postal data elements represented by the remaining portion of the same symbol, as the invariable postal data elements are independent of the subsequent, variable postal data elements.

The invention also embraces a multi-symbol approach where as illustrated in FIG. 4, machine readable portion 410 includes at least two symbols, e.g., data matrix symbols 415 and 420. One of the symbols may represent only those invariable postal data elements. Such a symbol is "invariable" or "fixed" by virtue of the invariable postal data elements represented thereby, and thus can be preset for printing in each franking transaction. The other "variable" symbol may represent the remaining postal data elements which may vary from transaction to transaction.

However, in this particular illustrative embodiment, data matrix symbol 415 represents those postal data elements which are invariable over at least a period of time. For example, in addition to the invariable postal data elements such as the device ID, originating address licensing zip code, software ID and PSD certificate, data matrix symbol 415 also represents the date of mailing which changes daily. Notwithstanding such, symbol 415 needs to be created only once per day with the current mailing date and is then set in a print memory for printing in each franking transaction for the rest of the day. Thus, the creation of symbol 415 does not consume real time during the franking transaction. On the other hand, the creation of symbol 420 representing the remaining postal data elements which may vary from transaction to transaction consumes real time.

Similarly, human readable portion 405 can be divided into two parts, namely, a "fixed" part including, e.g., information concerning the origination town and zip code, device ID and date of mailing which is invariable over at least a period of time; and a "variable" part including, e.g., information concerning the postage and mail class which may vary from transaction to transaction. The fixed part may be preset in the print memory for printing, and the variable part may be created in real time when the transaction occurs.

We have recognized certain advantages of the multi-symbol approach over the aforementioned single symbol approach. As mentioned before, each data matrix symbol includes error correction codewords to help ensure scanning success of the communication of the data represented thereby. In the multi-symbol approach, the computation of the error correction codewords for symbol 415 representing invariable postal data elements is completed prior to the franking transaction and does not consume real time of the transaction. However, the computation of the error correction codewords for symbol 420, which represents variable postal data elements and is created during the franking transaction, consumes real time. So does the computation of the error correction codewords for a single symbol representing both variable and invariable postal data elements in the single symbol approach. Nevertheless, the computation of the codewords for symbol 420 in the multi-symbol approach is simpler as the codewords afford error protection to fewer data elements than that for a single symbol in the single symbol approach. As a result, the multi-symbol approach is more real-time efficient in computing error correction codewords.

Other advantages of the multi-symbol approach over the single symbol approach include the versatile adaptability of multiple symbols into the required space of machine readable portion 410. For example, data matrix symbols 415 and 420 occupy relatively small square spaces, respectively, with respect to the otherwise, single symbol occupying a relatively large square space. Because of the smaller sizes of symbols 415 and 420, they can readily fit into the required space, e.g., a limited rectangular space. In addition, because of the availability of the few predetermined sizes of a data matrix symbol corresponding to the maximum amounts of data represented by the symbol, a single symbol may assume a data matrix symbol having much unused data capacity, thus wasting much space, and yet because of its postal data amount needed to be represented, the single symbol may not assume a smaller size. However, symbols 415 and 420 may assume data matrix symbols of different sizes to maximize use of the data capacities afforded thereby, and to save space at the same time.

Regardless of whether a single symbol or multiple symbols are used to represent the required postal data elements, because of the manipulation of the order of the postal data elements, e.g., invariable postal data elements followed by the variable postal data elements, in accordance with the invention, the sequence of the postal data elements represented by the single symbol or multiple symbols when read may not match the sequence expected by the postal authority. If that is the case, each postal data element represented by the single symbol or multiple symbols may be preceded by a field identifier indicating the order of the data element with respect to the sequence expected by the postal authority.

Figure 5A:
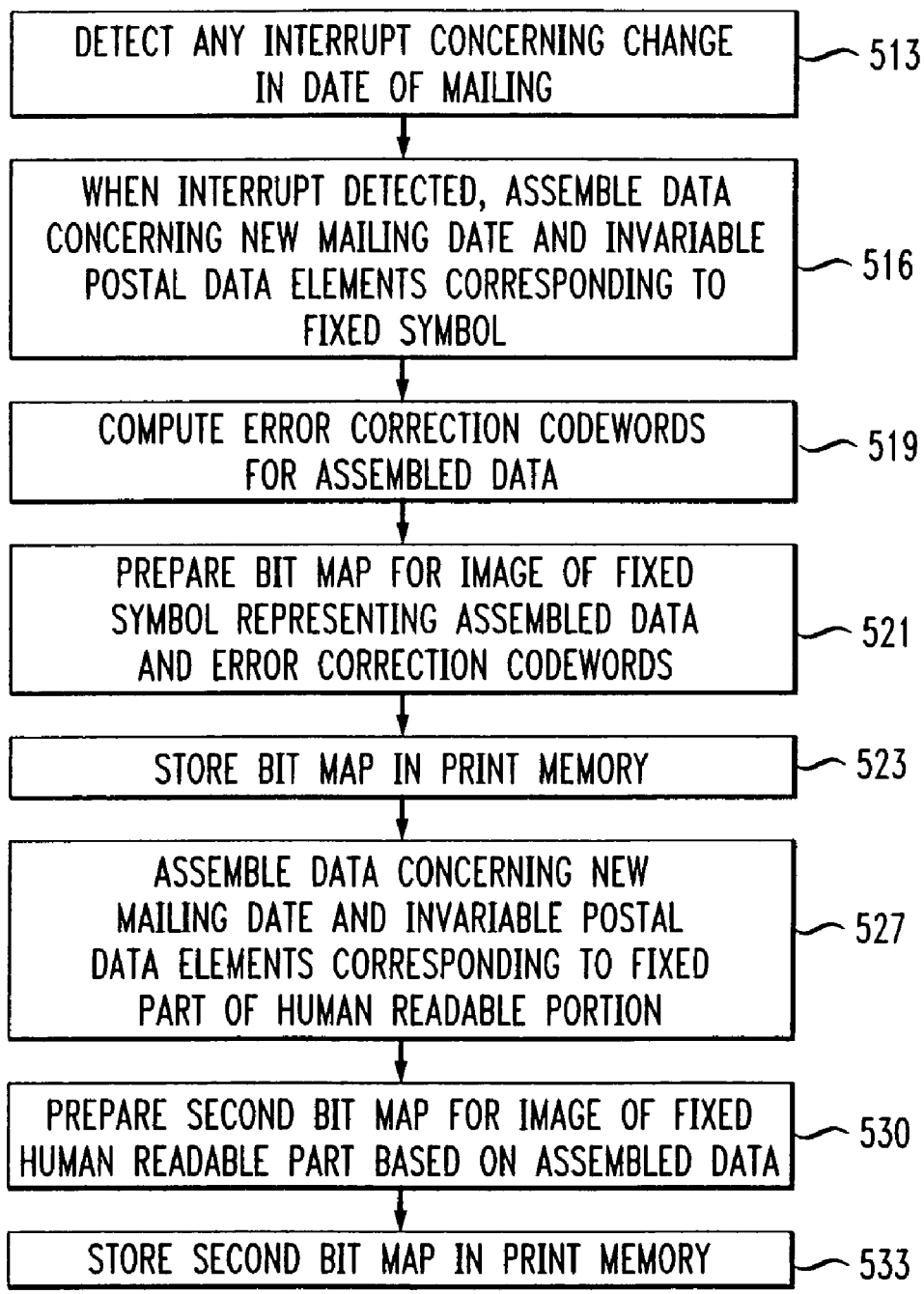
FIG. 5A is a flow chart depicting a subroutine for generating a part of the postage indicium of FIG. 4.
Figure 5B:
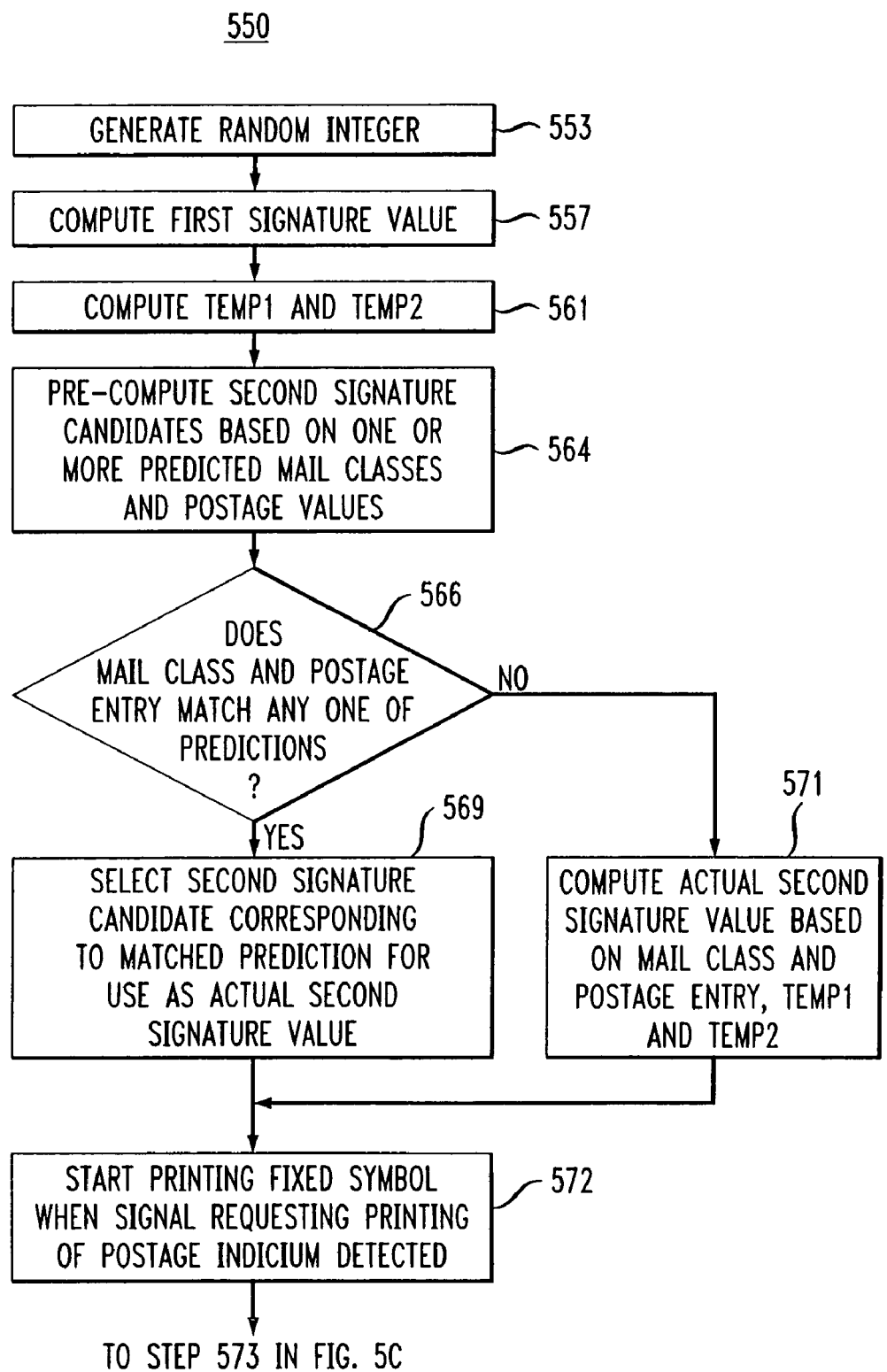
FIGS. 5B and 5C are flow charts jointly depicting a main routine for generating the postage indicium of FIG. 4.
Figure 5C:
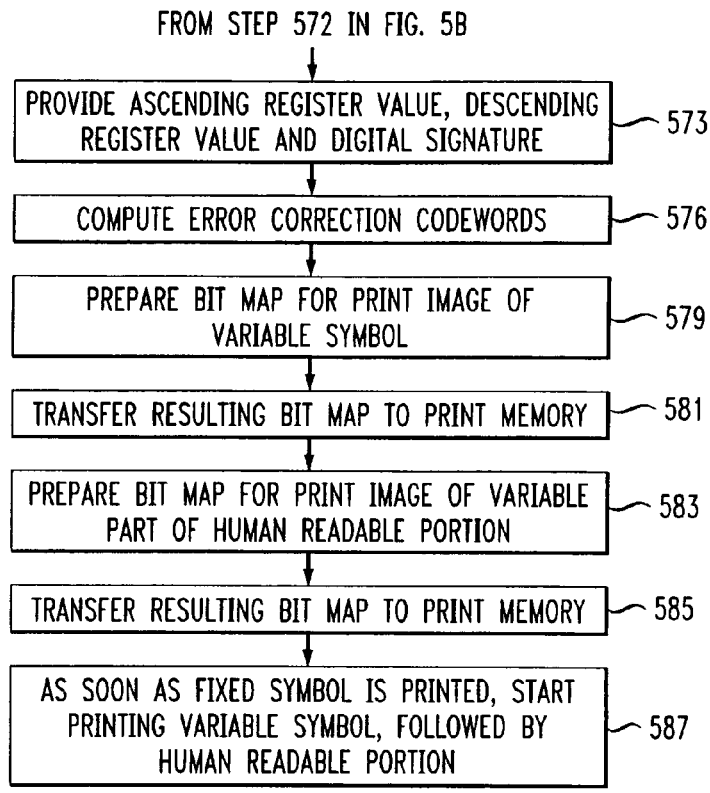

FIGS. 5A, 5B and 5C illustrate the aforementioned postage franking routine in accordance with the invention. This routine includes (a) subroutine 503 in FIG. 5A for generating fixed data matrix symbol 415 and the fixed part of human readable portion 405, representative of those postal data elements which are unaffected by franking transactions, and (b) main routine 550 in FIGS. 5B and 5C for franking postage indicium 400, including generating variable data matrix symbol 420 and the variable part of human readable portion 405, representative of the remaining postal data elements which may vary from one franking transaction to another.

Instructed by subroutine 503 in FIG. 5A, processor 255 in system 201 detects any interrupt concerning a change in the date of mailing which is a required postal data element for postage indicium 400, as indicated at step 513. Such an interrupt may be automatically generated by clock circuitry 272 at the beginning of each day, or caused by other date change mechanisms or by a user input adjusting the mailing date through user interface 271. When such an interrupt is detected, processor 255 at step 516 assembles the data concerning the new mailing date and other invariable postal data elements corresponding to fixed data matrix symbol 415 which are-pre-stored in memory 273. At step 519, processor 255 computes the error correction codewords for the assembled data in accordance with a well known error correction technique, e.g., the Reed-Solomon error correction technique. Processor 255 at step 521 then prepares a bit map for a print image of fixed symbol 415 representing the assembled data and error correction codewords just computed which are arranged in accordance with the Data Matrix specification. Processor 255 stores such a bit map in a print memory which may be a part of memory 273, as indicated at step 523. In addition, processor 255 at step 527 assembles data concerning the new mailing date and those invariable postal data elements corresponding to the fixed part of human readable portion 405. At step 530, processor 255 prepares a second bit map for a print image of the fixed human readable part based on the assembled data. Processor 255 at step 533 stores the second bit map in the print memory as well. Thus, during a franking transaction, printer 290 can readily retrieve from the print memory the preset bit maps for printing data matrix symbol 415, and the fixed part of human readable portion 405.

In order to fully appreciate main routine 550 involving creation of variable data matrix symbol 420, the generation of the aforementioned digital signature which is also represented by symbol 420 will now be described. In this illustrative embodiment, the required postal data elements represented by machine readable portion 410 are signed in accordance with a well known cryptographic algorithm, e.g., the DSA. The resulting digital signature whose representation is included in symbol 420 is used for authentication of postage indicium 400.

The digital signature is composed of a first signature value "r" which is 20 bytes long, and a second signature value "s" which is also 20 bytes long. In accordance with the DSA, the generation of the signature value "r" involves generation of a random (or psuedo-random) integer "k" in each franking transaction. The value "r" is a function of the integer "k" and certain given DSA parameters, and independent of the postal data elements to be signed. However, the generation of the signature value "s" involves applying a secure hash algorithm (SHA) onto the postal data elements to be signed. One such SHA is described in "Secure Hash Standard," *FIPS PUB* 180-1, Apr. 17, 1998. Specifically, the signature value "s", dependent on the values of the postal data elements to be signed, may be expressed as follows:

$$s=(k^{-1}(SHA(M)+xr))\bmod q, \quad [1]$$

where "$k^{-1}$" represents the multiplicative inverse of the random integer k; "M" represents the postal data elements to be signed onto which the SHA is applied; "x" represents the value of the aforementioned private key stored in secure memory 307; "r" represents the aforementioned first signature value; and "mod q" represents a standard modulus operation having a base q, which is one of the given DSA parameters.

Referring to FIG. 5B, instructed by main routine 550, processor 255 for each franking transaction causes cryptographic processor 305 in PSD 280 to generate a random integer k, as indicated at step 553. Based on the value of k, processor 305 at step 557 computes the first signature value r which is independent of the values of the postal data elements to be signed, i.e., M in expression [1]. In accordance with an aspect of the invention, processor 305 at step 561 computes temp1=$k^{-1}$ and temp2=xr in expression [1] even before knowing the actual mail class and postage to be dispensed which, however, affects only M, and thus SHA(M), thereby gaining some time to compute the second signature value s before such actual mail class and postage become known.

In accordance with another aspect of the invention, processor 305 further pre-computes candidates of the second signature value s based on one or more predicted mail classes and postage values to be dispensed, as indicated at step 564. Such predicted mail classes and postage values are formed in pairs based on statistics concerning past usage of mail classes and postage. In this example, system 201 uses three predicted mail class/postage pairs, which are the last mail class and postage actually dispensed by system 201, and the two most statistically likely mail class/postage pairs, e.g., first class mail/32¢ and first class mail/55¢, where 32¢ and 55¢ correspond to the two lowest weight limits of the first class mail. Once the unknown mail class and postage to be dispensed is assumed to be a prediction thereof, all of the variable postal data elements including the postage, ascending register value, descending register value and mail class are defined. Accordingly, M in expression [1], which represents all of the required postal data elements represented by machine readable portion 410, including the variable postal data elements, is also defined. In this instance, processor 305 pre-computes three "s" candidates corresponding to the respective predictions in accordance with expression [1].

As soon as processor 255 detects the actual mail class and postage entry by a user through user interface 271, processor 255 determines whether the actual postage and mail class just entered match any of the predictions, as indicated at step 566. If it is determined that the mail class and postage entry matches one of the predictions, processor 255 causes processor 305 to select the "s" candidate corresponding to the matched prediction for use as the actual second signature value, as indicated at step 569, thereby expediting the postage franking transaction. Otherwise, if it is determined that the mail class and postage entry does not match any prediction, processor 255 causes processor 305 to compute the actual second signature value based on the mail class and postage entry, and the pre-computed temp1 and temp2 above, in accordance with expression [1], as indicated at step 571.

As previously mentioned, the franking operation is performed by system 201 pursuant to the inventive pipeline approach. With the bit map of fixed symbol 415 preset in the print memory as described before, as soon as processor 255 detects a signal (e.g., from a conventional mail feeder (not shown) connected to system 201, or user interface 271) requesting printing of a postage indicium, say, indicium 400, corresponding to the aforementioned mail class and postage entry, processor 255 causes printer 290 to start printing fixed symbol 415 advantageously without latency, as indicated at step 572.

While symbol 415 is being printed, processor 255 is creating variable symbol 420 and the variable part of human readable portion 405, taking advantage of the print time for symbol 415. Specifically, referring to FIG. 5C, processor 255 at step 573 causes cryptographic processor 305 to provide thereto (a) the ascending register value and (b) the descending register value, taking into account the current dispensed postage, and (c) the digital signature which is composed of the aforementioned first signature value from step 557 and second signature value from step 569 or step 571. At step 576, processor 255 computes error correction codewords for the digital signature and the variable postal data elements including the postage, mail class, and ascending and descending register values received by processor 255, in accordance with a well known error correction technique, e.g., the Reed-Solomon error correction technique. At step 579, processor 255 prepares a bit map for a print image of variable symbol 420 representing such digital signature, variable postal data elements and error correction codewords which are arranged in accordance with the Data Matrix specification. At step 581, processor 255 transfers the resulting bit map to the print memory.

In addition, processor 255 at step 583 prepares another bit map for a print image of the variable part of human readable portion 405 including the dispensed postage and mail class. At step 585, processor 255 transfers the resulting bit map to the print memory as well. As soon as fixed symbol 415 is printed, at step 587, processor 255 causes printer 290 to start printing symbol 420, followed by human readable portion 405, based on the respective bit maps in the print memory, thereby realizing postage indicium 400.

As mentioned before, the use of additional data matrix symbols to represent the same amount of data enables one to reduce the size of individual symbols. However, in the event that the number of symbols used is limited, and the size of at least one of the symbols is larger than the print coverage of a printhead (not shown) of printer 290, the oversize symbol cannot be printed in a single pass of the printhead, incurring at least a second pass thereof to complete the oversize symbol. Such multiple passes of the printhead, versus a single pass thereof, to realize machine readable portion 410 undesirably reduce significantly the speed of the postage franking operation.

Figure 1A:
FIGS. 1A and 1B illustrate a prior art data matrix symbol and its finder patterns, respectively.
Figure 1B:
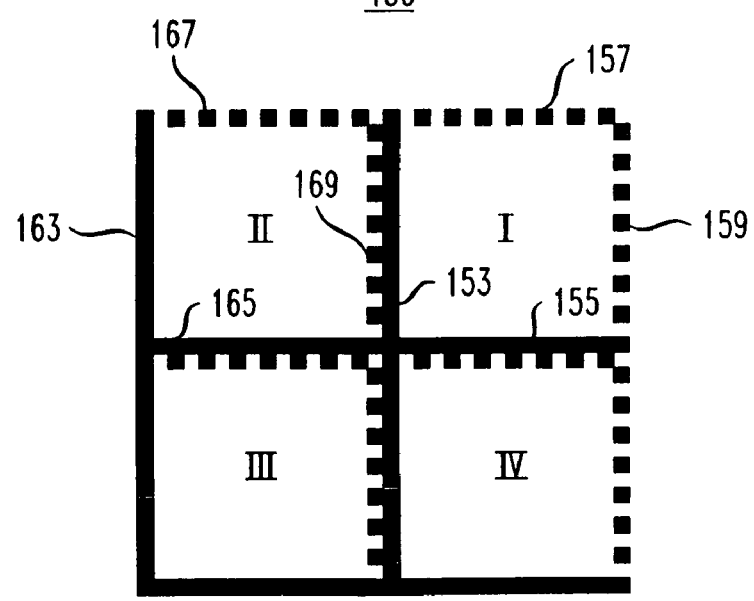
Figure 6:
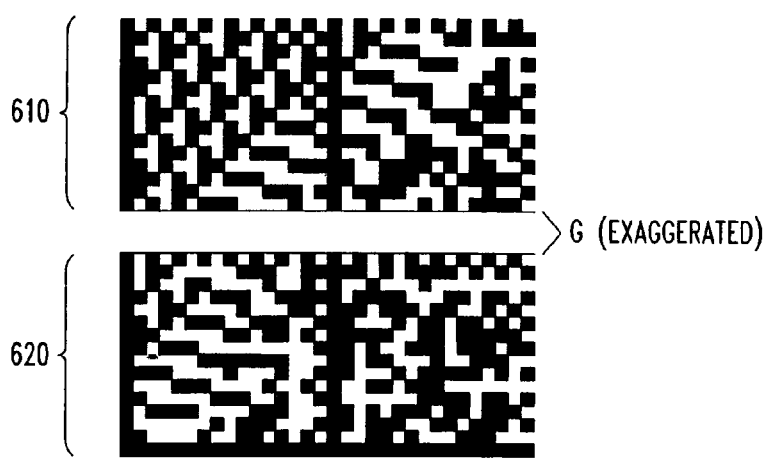
FIG. 6 illustrates a segmented data matrix symbol in accordance with the invention.

Referring back to FIGS. 1A and 1B, as described before, a data matrix symbol, e.g, data matrix symbol 100, includes four finder patterns (collectively denoted 150) for data regions I, II, III and IV, respectively. We have recognized that if data matrix symbol 100 is oversize and needs to be divided into segments for printing in a manner described below, an innocuous way to divide it is to separate data regions I and II from regions III and IV by solid arrays 155 and 165 of the finder patterns for data regions I and II, respectively. FIG. 6 illustrates the resulting segmented data matrix symbol, denoted 600. As shown in FIG. 6, symbol 600 includes upper symbol segment 610 and lower symbol segment 620. Except for solid arrays 155 and 165 which no longer appear in symbol 600 and are replaced by an inter-segment gap having a width G, which is exaggerated for illustrative purposes, symbol 100 is identical to symbol 600. In any event, the missing solid arrays 155 and 165 from symbol 100 are inconsequential to the determination of the size and distortion of symbol 100 using the remaining finder patterns. Thus, for data communications, symbol 600, even with its inter-segment gap narrower than G, is equivalent to symbol 100.

Figure 7:
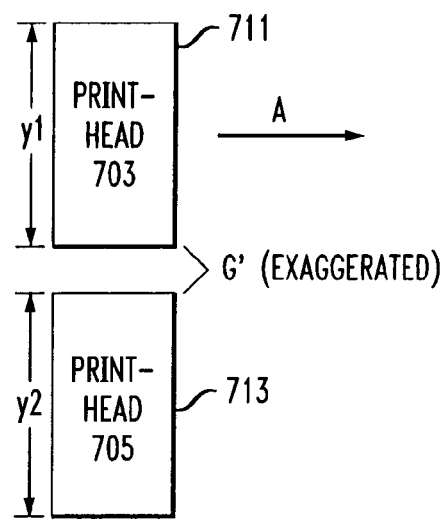
FIG. 7 illustrates a printhead assembly for generating the symbol of FIG. 6.

In accordance with the invention, in printing an oversize data matrix symbol, a printhead assembly comprising multiple printheads is used to print the symbol in a single pass of the assembly to maintain the high efficiency of the postage franking operation. FIG. 7 illustrates printhead assembly 700 in accordance with the invention which includes printheads 703 and 705, which are connected and arranged (or ganged) close to each other in the assembly. As shown in FIG. 7, the leading edge 711 of printhead 703 is aligned with the leading edge 713 of printhead 705. Assembly 700 is controlled by printer 290 to print in direction A to realize an oversize data matrix symbol, say, symbol 100, where the length of the symbol is longer than each of the length y1 of the print coverage by printhead 703 and the length y2 of the print coverage by printhead 705.

In practice, in assembly 700 printhead 703 is inevitably separated from printhead 705 by a separation. Without sacrificing the data integrity of oversize symbol 100, in accordance with the invention, assembly 700 generates a version of symbol 600, instead, which is equivalent to symbol 100. Specifically, printhead 703 controllably prints symbol segment 610 while printhead 705 controllably prints symbol segment 620, with the width of the otherwise solid arrays 155 and 165 provides the tolerance for the separation between printheads 703 and 705. In other words, the separation between printheads 703 and 705 is made to fall within gap G in FIG. 6, and is denoted G', which is also exaggerated in FIG. 7. In effect, gap G is provided to compensate for mechanical tolerance and the alignment of printheads 703 and 705.

It should be noted at this point that in accordance with the Data Matrix specification, each data matrix symbol can be realized in either a "dark on light" format or a "light on dark" format, representing identical information including the finder patterns. For example, symbol 100 is illustrated in FIG. 1 in a "dark on light" format. Its "light on dark" counterpart has each light module in symbol 100 become a dark module and conversely each dark module become a light module. In particular, the solid arrays in the "light on dark" counterpart consists of light modules or blanks. As such, print assembly 700 is particularly advantageous to realize data matrix symbols in the "light on dark" format, with the separation G' between printheads 703 and 705 effectuating the solid arrays therein which are naturally blank.

Similarly, printhead assembly 700 may also be used to print an oversize human readable portion, although the data integrity there is much less susceptible to any misalignment of printheads 703 and 705 in the assembly.

Figure 8:
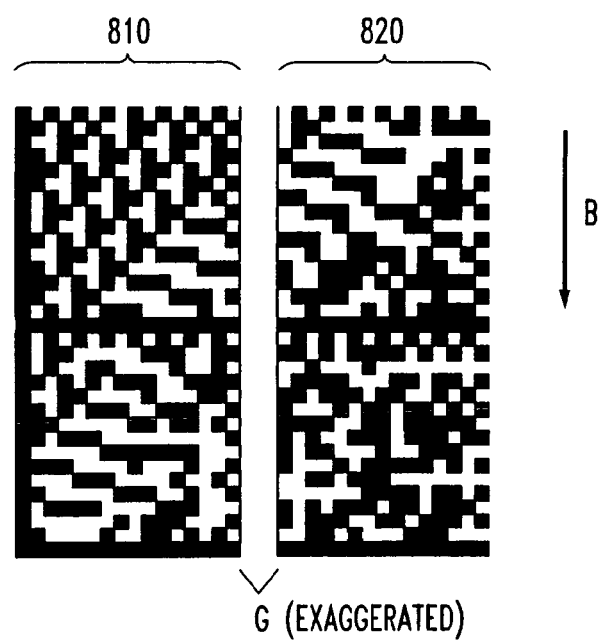
FIG. 8 illustrates a second, segmented data matrix symbol in accordance with the invention.

FIG. 8 illustrates another segmented data matrix symbol 800 equivalent to oversize symbol 100. Symbol 800 is designed for those printers which print in direction B, as opposed to direction A in FIG. 7. Similarly, the printhead assembly (not shown) for generating a version of symbol 800 includes first and second printheads separated from each other by a separation G'. The first printhead controllably prints symbol segment 810 and the second printhead controllably prints symbol segment 820, with the separation G' falling within gap G (also exaggerated for illustrative purposes) of symbol 800, where gap G coincides with the otherwise solid arrays of oversize symbol 100.

The foregoing merely illustrates the principles of the invention. It will thus be appreciated that those skilled in the art will be able to devise various modifications or alterations which, although different from the exemplary embodiments described herein, are within the scope as defined by the appended claims.

For example, in the disclosed embodiment, data matrix symbols are used to illustrate the principles of the invention. However, it will be appreciated that other barcodes such as PDF 417 barcodes, or other similar segmenting image presentations, stacked codes or symbols representative of information may be used, instead, to implement the invention.

In addition, in the disclosed embodiment, the bit map for a print image representing data is illustratively generated in host device 250. However, it will be appreciated that alternatively the data will be provided by device 250 in the form of image vectors to printer 290, in accordance with a printer protocol or printer control language. Printer 290 will then generate the bit map based on the received image vectors.

Moreover, in the disclosed embodiment, machine readable portion 410 illustratively includes multiple symbols which are readable by a scanner. It will be appreciated that in accord with the invention, the multiple symbols as a whole will be scanned only once by the scanner, and the presence of the multiple symbols will be recognized by the single pass of the scan. The scanner will then decode each individual symbol to recover the postal information represented thereby.

Finally, the illustrative embodiment of the invention is disclosed herein in a form in which the various data processing functions are performed by discrete functional blocks. These functional blocks may be implemented in various ways and combinations using logic circuitry and/or appropriately programmed processors, as will be known to those skilled in the art.

What is claimed is:

1. A method for printing a postage indicium, comprising:
   prior to receiving a request to print the postage indicium:
   determining a predicted value of variable postal data; and
   precomputing a code to authenticate the postage indicium based on the predicted value of variable postal data;
   after receiving the request to print the postage indicium:
   determining an actual value of the variable postal data for a piece of mail; and
   comparing the predicted value to the actual value;
   if the actual value matches the predicted value, then printing the postage indicium based on the precomputed code; and
   if the actual value does not match the predicted value, then computing a code to authenticate the postage indicium based on the actual value of the variable postal data and printing the postage indicium based on the computed code for the actual value.

2. The method of claim 1, further comprising computing the code for the actual value based on a portion of computation results generated when computing the code for the predicted value.

3. The method of claim 1, wherein precomputing comprises computing the code based on a digital signature algorithm.

4. The method of claim 1, wherein determining the predicted value of the variable postal data includes statistically determining the predicted value of the variable postal data.

5. The method of claim 1, wherein determining the predicted value of the variable postal data is based on an actual value of the variable postal data from an immediately prior franking transaction.

6. The method of claim 1, wherein the predicted value of the variable postal data comprises a postage value.

7. The method of claim 1, wherein the predicted value of the variable postal data comprises a class of mail.

8. The method of claim 1, further comprising calculating a portion of the postage indicium based upon invariable postal data prior to receiving the request to print the postage indicium.

9. A mailing system to print a postage indicium, comprising:
   a postal security device configured to precompute a code to authenticate the postage indicium based on a predicted value of variable postal data element prior to receiving a request to print the postage indicium;
   a processor configured to determine an actual value of the variable postal data element for a piece of mail, and compare the predicted value to the actual value; and
   a printer that prints the postage indicium based on the precomputed code if the actual value matches the predicted value,
   wherein, if the actual value does not match the predicted value, then the postal security device computes a code to authenticate the postage indicium based on the actual value of the variable postal data and the printer prints the postage indicium based on the computed code for the actual value.

10. The system of claim 9, wherein the postal security device computes the code for the actual value based on a portion of computation results generated when computing the code for the predicted value.

11. The system of claim 9, wherein the postal security device computes the precomputed code based on a digital signature algorithm.

12. The system of claim 9, wherein the processor statistically determines the predicted value of the variable postal data.

13. The system of claim 9, wherein the processor determines the predicted value of the variable postal data based on an actual value of the variable postal data from an immediately prior franking transaction.

14. The system of claim 9, wherein the predicted value of the variable postal data comprises a postage value.

15. The system of claim 9, wherein the predicted value of the variable postal data comprises a class of mail.

16. The system of claim 9, wherein the processor calculates a portion of the postage indicium based upon invariable postal data prior to receiving the request to print the postage indicium.

17. The method of claim 1, wherein the predicted value is determined prior to detecting a mail class of the piece of mail.

18. The system of claim 9, wherein the predicted value is determined prior to detecting a mail class of the piece of mail.

* * * * *